United States Patent
Bare et al.

(10) Patent No.: US 6,654,382 B1
(45) Date of Patent: Nov. 25, 2003

(54) NETWORK DEVICE WITH LOGICAL-ADDRESS LEARN MODE

(75) Inventors: Ballard C. Bare, Auburn, CA (US); Bruce W. Melvin, Roseville, CA (US)

(73) Assignee: Hewlett-Packard Developmemt Company, L.P., Houston, TX (US)

(*) Notice: Subject to any disclaimer, the term of this patent is extended or adjusted under 35 U.S.C. 154(b) by 0 days.

(21) Appl. No.: 09/179,103

(22) Filed: Oct. 26, 1998

(51) Int. Cl.[7] .............................................. H04L 12/66
(52) U.S. Cl. ....................... 370/463; 370/392; 370/409; 709/220; 710/9
(58) Field of Search .......................... 713/201; 709/245, 709/230, 220–222, 239, 223, 224; 710/8, 10, 103, 104, 9; 705/79; 714/4; 370/235, 389, 252, 437, 401, 400, 408, 254, 392, 399, 409, 463

(56) References Cited

U.S. PATENT DOCUMENTS

| | | | | |
|---|---|---|---|---|
| 5,446,897 A | * | 8/1995 | Mathias et al. | ............. 709/220 |
| 5,875,306 A | * | 2/1999 | Bereiter | ...................... 709/220 |
| 5,974,562 A | * | 10/1999 | Townsend et al. | ............. 714/4 |
| 6,061,739 A | * | 5/2000 | Reed et al. | .................. 709/245 |
| 6,157,965 A | * | 12/2000 | Mohammed et al. | .......... 710/8 |
| 6,457,069 B1 | * | 9/2002 | Stanley | ........................... 710/8 |
| 6,470,013 B1 | * | 10/2002 | Barach et al. | ............... 370/392 |

* cited by examiner

*Primary Examiner*—John Pezzlo

(57) ABSTRACT

A laptop computer is coupled to a first port of a network hub for the purpose of assigning a logical address to it. The network manager depresses a front panel button on the hub to activate a logical address learn mode. The network manager types a "ping" command into the laptop, specifying as the logical destination address the address to be adopted by the hub. The laptop, unable to find a matching physical address for the logical address, issues an address-resolution packet (ARP). The hub responds by adopting the destination address as its logical address and exiting learn mode; the hub replies with its physical address. The laptop, now informed of the hub's physical address, issues the ping request. The hub responds normally to this request, providing confirmation at the laptop that the logical address has been properly assigned. The present invention thus provides for hubs and other network infrastructure devices that can be programmed using universally available commands and without dedicated non-network ports.

22 Claims, 3 Drawing Sheets

NETWORK DEVICE WITH LOGICAL-ADDRESS LEARN MODE

BACKGROUND OF THE INVENTION

The present invention relates to computer networks and, more particularly, to computer networks with hierarchical addressing schemes. A major objective of the invention is to provide for more convenient assignment of an Internet protocol address to a network infrastructure device such as a hub or a switch.

Much of modern progress is associated with the increasing prevalence of computers. As they have become more prevalent, communication between computers has become imperative.

Computer networks have been developed to provide for this communication.

The largest computer network is the Internet. It connects tens of thousands of networks, and millions of computers. It is used daily by tens of millions of people, with connections in most of the world's countries. In order for a computer to communicate over the Internet, it must conform to certain protocols, e.g., TCP/IP (Transfer Control Protocol/Internet Protocol), implemented by the Internet. While many local area networks do not implement Internet protocols, the trend is toward conformance to Internet standards so that network managers and users do not have to learn two entirely distinct systems to work both over the local network and over the Internet. Accordingly, the following discussion emphasizes networks that comply with Internet protocols and interface guidelines.

On a hardware level, a network comprises network devices, and communications media. Network devices include both network end-node devices (computers and peripherals) and network infrastructure devices (hubs, switches, and routers). "Communications media" encompasses metal cables, fiber optic links, as well as wireless transmitters and receivers.

Communication takes the form of packetized data transmitted over the media. The packets contain not only the information to be communicated, but also source and destination addresses. In simple networks, it is sufficient to transmit a message on a broadcast medium to all network devices; each network device examines the destination address, processing or ignoring the packet contents depending on whether the destination address matches the physical address of the device. The ratio of intended packets to unintended packets examined by a device falls with the number of devices. Thus, for large networks, network-wide transmission is ineffective, since an excessive portion of the network bandwidth available to a device is consumed by messages not intended for it.

A switch prevents a packet from crossing segments unless such crossing is necessary for the packet to reach its destination. In order to execute such filtering, a switch must know (be programmed with information about or learn by examining the source addresses of throughgoing packets) the network locations of devices. Multi-segment networks typically provide for broadcasting, e.g., of packets specifying "broadcast" as the destination address. For example, address resolution packets (ARPs) are typically broadcast.

Networks with flat physical addressing schemes suffer from two limitations as the number of network devices increases. First, for very large networks, especially those in which devices are frequently added, removed, and moved, it is not practical to learn the network location of every device on the network. Accordingly, for a large percentage of packets, the destination address is not known to a switch, which, by default, must then broadcast the packet. Second, packets designated for broadcast consume excessive network bandwidth even though they might constitute a relatively small percentage of packets transmitted.

The Internet protocols handle these problem by supplementing a flat physical-addressing scheme with a hierarchical logic-addressing scheme. For a familiar analogy, the conventional (non-cellular) phone system uses hierarchical addressing in that each phone number expresses or implies a country code and typically an area or city code. (Typically, the country/area codes are omitted for calls within the country/area). If a phone is moved from one area to another, the phone number used to access it is changed. An advantage of the hierarchical scheme is that routing from the source address can be made to a particular country or area without knowledge of the specific location of the destination address. Once the call reaches the destination country/area, a router local to the country/area directs the call to the specific location of the phone called.

The Internet is divided into domains (e.g., uspto.gov). Logical addresses specify a domain and location within a domain. When a packet is transmitted, a router local to the transmitter only needs to know how to get the packet to the destination domain. A router within the destination domain then knows how to move the packet to the specified destination address within the domain. Broadcast packets are only broadcast within a domain, not over the entire network—thus keeping the bandwidth burden within acceptable bounds.

Accordingly, networks that are Internet compliant or employ analogous hierarchical addressing schemes require that each device that is to serve as the source or destination of a packet be assigned an IP (Internet Protocol) or other logical address. In general, network infrastructure devices are intended to function invisibly to the network user. Thus, in normal use, network infrastructure devices such as hubs and switches are transfer stations for, but not the source or destination of a packet. Accordingly, it is possible for a network to function with network infrastructure devices that do not have logical addresses assigned. (This does not apply to routers, which, by nature, have logical addresses associated with the domains they define.)

On the other hand, network infrastructure devices are well situated for detecting, responding to, and even correcting network problems. To these ends, many network infrastructure devices include detectors and counters for determining the frequency with which certain problem-indicating events (e.g., packet collisions) occur. A network manager can benefit from access to the information gathered by a network infrastructure device and should be able to intervene, e.g., to turn ports on and off. For this reason, a network manager should be able to communicate with a network infrastructure device via the network. For this communication to occur, the network infrastructure device should be assigned a logical address.

Some hubs and switches are designed so that they do not operate until a suitable logical address is assigned to them. However, allowing a hub or switch to operate without a logical address affords more flexibility to the network manager in seting priorities. A network manager might decide that it is unnecessary to manage a device, and thus decide to forego assignment of a logical address. Also, a network manager might well defer assignment of a logical address in favor of addressing more immediate concerns involving getting node devices working with the hub or switch.

There are established protocols for assigning logical addresses over a network. BOOTP (boot protocol) is an older and more prevalent protocol, and DHCP (dynamic host configuration protocol) is newer, more flexible, convenient, and powerful. Both protocols require a dedicated logical address server; such a server is expensive and must be configured and maintained. Configuration typically requires a high level of training and can be tedious. Unless the boot protocol is enabled by default, a device must be enabled manually at the device. Furthermore, the requirement for a dedicated server can also be cumbersome, as a network manager might have to shuttle between the location of the server and the location of a network infrastructure device during installation and problem isolation.

Because of the expense and inconvenience, not all networks implement boot protocols; furthermore, even for networks implementing a boot protocol for logical addressing, it can be convenient to have the option to assign a logical address at the device itself.

To this end, some switches and hubs include a dedicated port to permit a logical address to be assigned. For example, Hewlett-Packard has manufactured some devices with serial (RS232) ports that can be accessed, for example, by a portable computer, so that the logical address can be assigned by typing on a terminal connected to the serial port. This approach allows the address to be assigned locally and independent of any address assignment protocols supported on the network. However, the dedicated port (and supporting software and circuitry) on a network infrastructure device adds to device cost. This additional cost can seem wasteful given the availability of multiple network ports on the device. In addition, the required serial port connector consumes valuable space on the devices face plate.

What is needed is a network infrastructure device and a method for assigning logical addresses to such a device that achieves the compatibility of a device with a dedicated non-network port without actually requiring the non-network port. Furthermore, the approach should allow the device to function without an assigned logical address so that it can be programmed at the network manager's convenience.

SUMMARY OF THE INVENTION

The present invention provides a network device with a logical-address learn mode that can be activated, for example, through a front-panel button. When in this learn mode, the network device adopts, as its logical address, the logical destination address of a received packet. The learn mode preferably implements some constraints, for example, only one port is used for learning (while others remain in network mode operation) and only certain packet types trigger the adoption of the logical destination, address. Also, preferably, the device exits learn mode as soon as a logical address is adopted, thus permitting the device to operate as though the logical address were assigned before the packet was received.

A method of the invention from the perspective of the network device to be programmed involves receiving a command to enter a learning mode. In this mode, a packet is received at a port assigned the learn function. The logical destination address of the packet is then stored as the logical address of the device. The device then automatically exits the learn mode and enters a normal networking mode, responding to the packet as though the newly programmed logical address were the logical address of the network device before the packet was received. "As though" as used here encompasses either adopting the logical address immediately and unconditionally or awaiting for some sort of confirmation before adopting the logical address unconditionally.

From the perspective of the network manager, the inventive method is as follows. The manager couples a programming device (e.g., a network ready laptop computer) to a port of the network device assigned to the learning function. The manager then operates the programming device so that it will issue a command (e.g., "ping" or HTTP "get") to the logical address to be programmed. The network protocol requires a physical address accompany the logical address. However, this physical address is not known to the programming device. In accordance with the Internet protocols, an address resolution packet, e.g., IP ARP, is transmitted to the logical address. The normal purpose of an address resolution packet is to command the device with the specified logical address to transmit a packet indicating its physical address. The network device does respond with a physical address (after adopting the logical address and exiting learn mode). The programming device then transmits the command indicated by the network manager. The network device then responds as appropriate for the command.

The invention relies on virtually universally available commands rather than on commands that are proprietary or of limited currency. No dedicated ports are required. In the preferred embodiment, a front panel button is used to activate learn mode. This is less expensive and less cumbersome than a dedicated serial port. The invention can be implemented by adding the learn-mode function to a multi-purpose button so that no additional mechanical components are required. The network device can even continue network operations (if, as most network infrastructure devices do, it has ports other than the one used for programming). The port used for programming can be used for network operation once programming is complete. These and other features and advantages of the invention are apparent from the description below with reference to the following drawings.

BRIEF DESCRIPTION OF THE DRAWINGS

In FIG. 3, the following conventions are applied. Steps involving the network manager use rounded rectangles. Steps involving the laptop computer (programming device) use broken lines. Steps involving both the laptop computer and the hub (network device) use lines with alternating short and long segments. Steps involving only the hub are solid rectangles.

DESCRIPTION OF THE PREFERRED EMBODIMENTS

Figure 1:
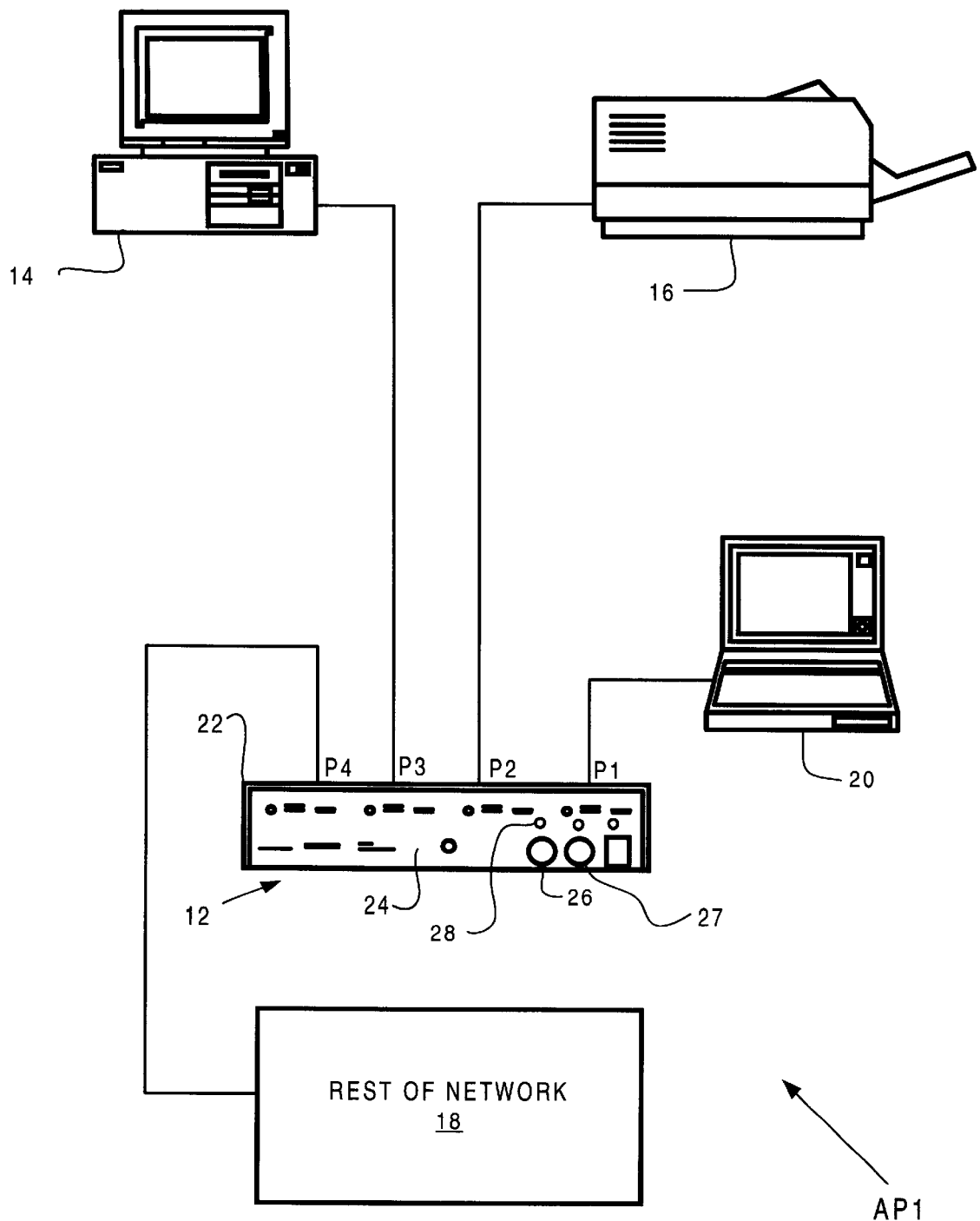
FIG. 1 is a schematic diagram of a computer network including a hub in accordance with the present invention.

A computer network AP1 comprises a network hub 12, a desktop computer 14, a printer 16, and the rest of the network 18, as shown in FIG. 1. Also shown in FIG. 1 is a laptop computer 20 temporarily connected to the network for the purpose of programming a logical address for hub 12. Hub 12 has an enclosure 22 that houses the hub circuitry. Accessible from outside enclosure 22 are four network ports P1–P4, a power receptacle (not shown), and a control panel 24.

Control panel 24 includes value-select button 26 that selects the value of a parameter selected by a parameter-select button 27. When parameter-select button selects the parameter "logical-address learn mode off/on", depressing value select button 26 activates a logical-address learn mode of operation for hub 12. A corresponding light-emitting diode 28 lights while this mode is active.

Since learn-mode activation is the only function of value-select button 26 herein, it is henceforth referred to as learn-mode activation button 26. (The invention also provides for a single-multifunction-button embodiment in which when operated in a predetermined manner, e.g., a double-click, activates learn mode.)

Figure 2:
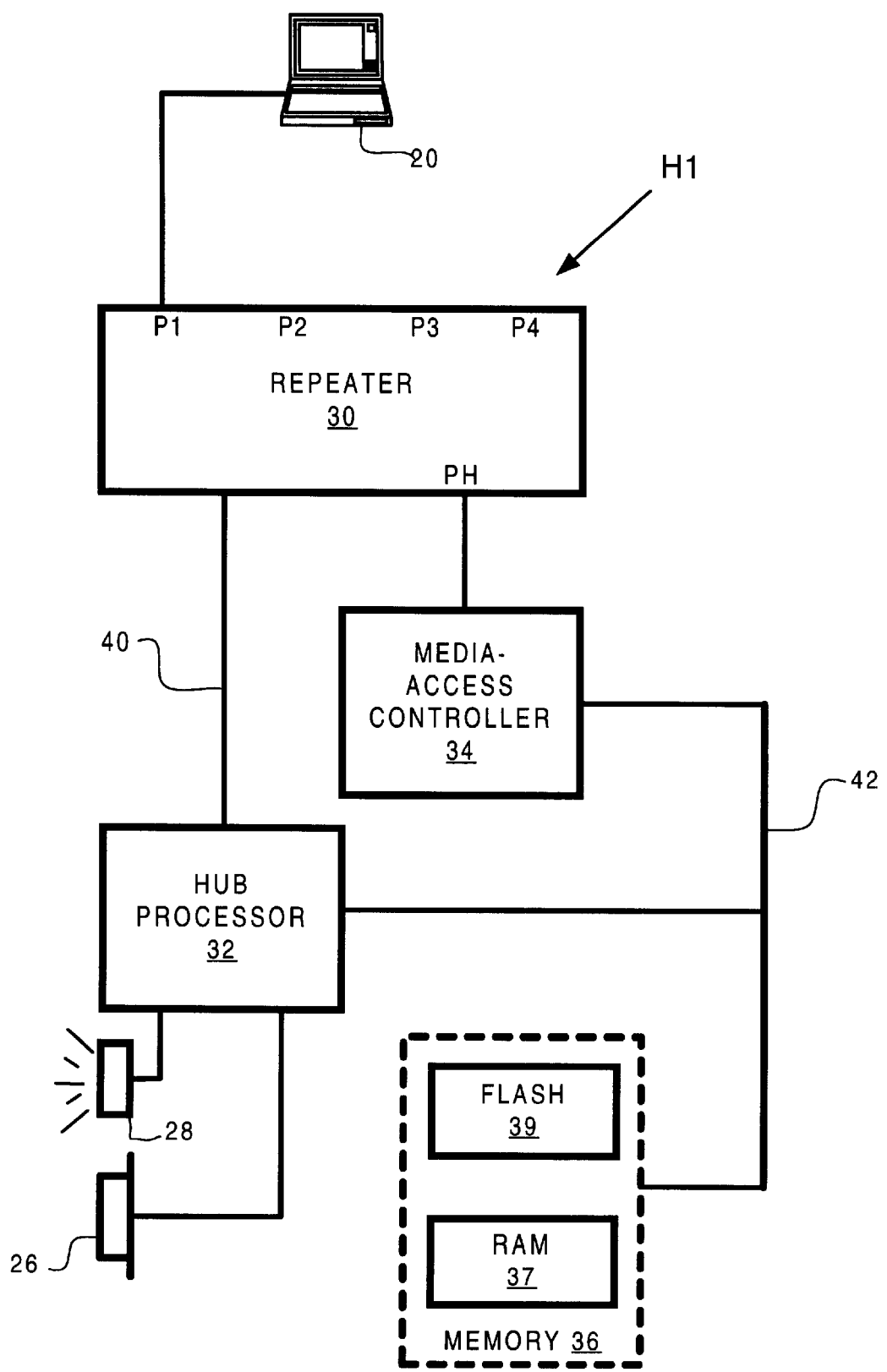
FIG. 2 is a schematic diagram of the hub of FIG. 1.

Hub 12 includes a repeater 30, a hub controller 32, a media access controller 34, and memory 36, as shown in FIG. 2. Memory 36 includes volatile RAM (random-access memory) 37 and nonvolatile flash memory 39. Repeater 30 is coupled to ports P1–P4, handling the flow of packets through hub 12. Repeater 30 includes detectors for detecting events of interest (e.g., packet collisions) at each of the ports. In addition, hub 12 includes counters coupled to the detectors for counting events of the types detected. The detectors and counters are conventional components of a hub and are not separately indicated in the figures.

Hub controller 32 is coupled to repeater 30 via a control bus 40 for accessing counter data and for controlling hub 12. Control actions include enabling and disabling ports, and resetting counters. Hub controller 32 is coupled to learn-mode button 26 to determine when learn mode is activated; in addition, hub controller 32 is coupled to LED 28 to provide an indication of when learn mode is active.

Media-access controller 34 handles communications in which hub 12 is a destination or a source. To this end, media-access controller 34 is coupled to repeater 30 through an internal data "port" PH. Hub 12 is normally a source and a destination during network management activity.

Both hub controller 32 and media-access controller 34 are coupled to memory 36 via an internal data bus 42. Flash memory 39 stores operating system for hub controller 32 and media access controller 34. It also stores the physical address for hub 12. RAM 37 permits controllers 32 and 34 to access, store, and manipulate data (until hub 12 is turned off).

Laptop 20 is shown coupled to hub 12 at port P1 in FIGS. 1 and 2. It is contemplated that any device previously coupled to port P1 is decoupled, and laptop 20 connected in its place for the purpose of programming a logical address for hub 12. Once the logical address is programmed, the laptop can be disconnected and the original device reconnected. Of course, the programming device need not be a laptop computer; for example, it can be a desktop computer or a network management workstation, and it can be permanently connected to hub 12. However, the contemplated mode of operation is for a network manager to plug laptop 20 successively into different network infrastructure devices to program them in succession.

Figure 3:
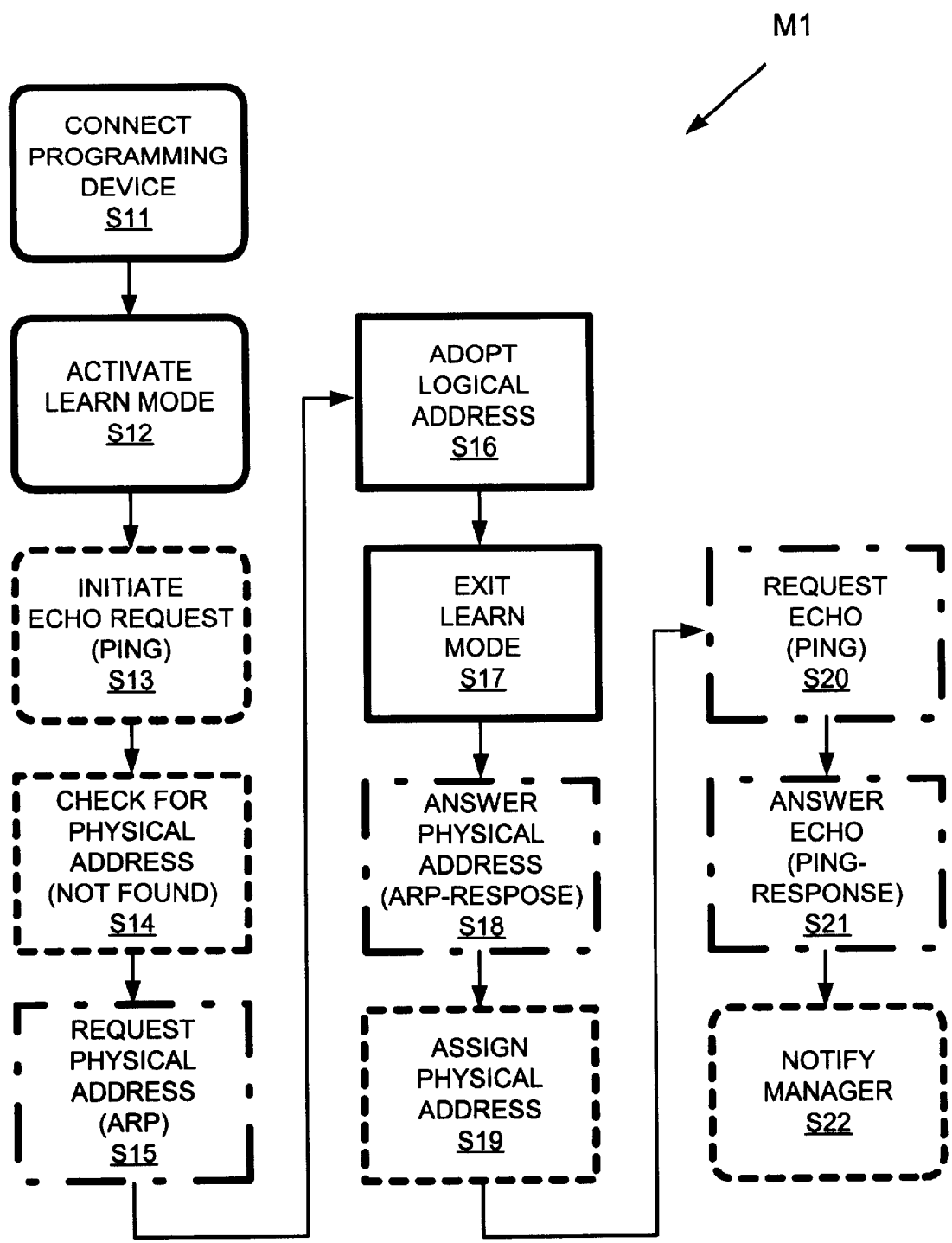
FIG. 3 is a flow chart of a method of the invention practiced in the context of FIG. 1.

A method M1 practiced in the context of network AP1 is flow charted in FIG. 3. A network connection is made between laptop 20 and hub 12 using the latter's port P1, at step S11. If necessary, a device previously connected to port P1 can be temporarily disconnected for the duration of method M1.

Logical-address learn mode is activated at step S12. From the perspective of the network manager, learn mode is activated by depressing learn-mode button 26 on the front panel 24 of hub 12. From the perspective of hub 12, learn mode is activated in response to this depression by setting a mode flag in flash memory 39. Hub 12 indicates that learn mode is activated by illuminating LED 28.

A "ping" command is initiated by the network manager at step S13 by typing and entering the appropriate command line, specifying the logical address to be programmed as the logical destination for the "ping" command. According to the ICMP (Internet Control Management Protocol) Internet protocol, "ping" generates a "unicast" packet that requires specification of both a physical address and a logical address. Accordingly, laptop 20 checks, at step S14, an ARP cache to determine if the specified logical address has been assigned to a physical address. Since the specified logical address is new, no physical address is found.

To determine the physical address to which the specified logical address is assigned, laptop 20 transmits, at step S15, an address-resolution packet (ARP), so that it is received at port P1 of hub 12. In accordance with learn-mode operation (and contrary to normal network mode operation), hub 12 adopts, at step S16, the logical destination address of the address-resolution packet as its logical address, storing this address in flash memory 39. Hub 12 exits learn mode in favor of normal network operation mode at step S17.

Accordingly, hub 12 turns off LED 28.

In step 18, hub 12 transmits an ARP response specifying the physical address of hub 12. Upon receiving the ARP response, laptop 20 assigns, at step S19, the specified physical address to the logical address specified in the original ARP packet. More specifically, the physical address of the device is associated with the new logical address in the ARP cache.

At step S20, laptop 20 transmits and hub 12 receives the previously requested "ping" request. At step S21, hub 12 transmits and laptop 20 receives a "ping" response. At S22, laptop 20 notifies the network manager of reception of the "ping" response by displaying text to this effect. The "ping" response serves as positive feedback that the address was learned. Optionally, laptop 20 can be disconnected from port P1. Any network device previously disconnected can be reconnected at this point.

At this end of method M1, hub 12 is now a network manageable device. Hub 12 now responds in normal network operational mode to packets addressed to the programmed logical address. Any device needing the hub's physical address can transmit an ARP request and receive the required physical address in response.

In the preferred embodiment, exiting learn mode (step S17), occurs before answering the ARP request and before the subsequent "ping" is received. The invention also provides for making an ARP response before exiting learn mode or concurrently therewith. This alternative makes no difference if learn mode is exited unconditionally.

Another alternative embodiment makes the ARP response while in learn mode, and refrains from exiting learn mode unless and until a "ping" request with the same source address as the ARP is received before a predetermined timeout expires. If the required "ping" request is not received, then the logical address is not changed. This procedure provides additional insurance against an accidental resetting of a logical address. The invention further provides for use of these and similar conditions in combinations with other conditions to protect against unintended changes in the logical address of a network device.

While the Internet device to be assigned a logical address is a hub in the embodiment described above, the invention applies as well to other multi-port network infrastructure devices. In fact, the invention can be applied to any type of network device, although most end-node devices have other provisions for having a logical address assigned. For example, a computer can be programmed using its own interface, rather than through the network.

In the preferred embodiment, pressing a multifunction button activates learn mode. Alternatively, a button can be dedicated to the learn mode. This approach incurs a small expense for the button dedicated to this new function, but simplifies the user interface. The activation interface need not be a button. It can be a membrane, a dial, a touch screen, etc.

It is also possible to activate learn mode over the network using a specific code for the purpose. Care would have to be taken to ensure that learn mode could not be established unintentionally. To this end, the conditions discussed above for retaining an adopted logical address and exiting learn mode can be applied.

A laptop is used as a programming device in the illustrated embodiment. It is contemplated that infrastructures would be installed and operate without programming initially. When convenient, the network manager could tour the facility with the laptop, programming several network infrastructure devices in succession. However, the invention provides for the use of other programming devices, including desktop computers, workstations, palmtops etc. For example, it can be recommended practice that the first port of each network infrastructure device in accordance with the invention be connected to a computer (rather than a peripheral). In that case, the network infrastructure device can be programmed without changing connections.

In the preferred procedure, programming is effected with the combination of an ARP request and a "ping" request. Actually, the programming is complete before the "ping" packet is transmitted. Alternatively, programming could be aborted if an ARP is not followed by a "ping". Options include allowing commands in addition to or instead of the ping and ARP commands. In view of the increasing popularity of the World Wide Web, which uses the hypertext transfer protocol (HTTP), an HTTP "get" request is an important alternative to the ping. The "get" request would be issued from a friendlier browser, rather than from a less friendly DOS interface. Of course, another option is to allow the "ping" request to be issued from a graphic user interface, such as a web browser.

While the preferred embodiment complies with Internet protocols, the present invention also applies to other networking schemes with hierarchical addressing. Other variations upon and modifications to the described embodiments are provided for by the present invention, the scope of which is defined by the following claims.

What is claimed is:

1. A network device comprising:
   at least one network port;
   memory for storing a logical address and a predetermined physical address;
   a learn-mode activator for activating a logical-address-learn mode; and
   a processor for controlling said port in accordance with a network protocol when a normal-network mode is active, said processor setting said logical address to a received address, said received address being received at said port while said logical-address-learn mode of operation is active, said processor being coupled to said port for controlling it, said processor being coupled to said learn-mode activator for being responsive to the mode selected thereby, and said processor being coupled to said storage means for storing said logical address during said logical-address-learn mode.

2. A network device as recited in claim 1 wherein said processor exits said logical-address-learn mode and enters said normal network mode once said logical address is stored while said logical-address-learn mode is active.

3. A network device as recited in claim 1 wherein said learn mode activation means includes a button that when depressed under certain conditions results in entrance of said logical-address-learn mode.

4. A network device as recited in claim 1 further comprising additional network ports that operate in said normal network mode even while said logical-address-learn mode is active.

5. A network device as recited in claim 1 wherein said processor, while said logical-address-learn mode is active, stores as the logical address of said network device a received logical address received as part of an address resolution packet.

6. A network device as recited in claim 5 wherein said processor only stores as the logical address of said network device a logical address received as part of an address resolution packet.

7. A method of operating a network device, said method comprising the steps of:
   operating said network device on a network in a normal network mode while it has no logical address;
   while said device is in said normal network mode, initiating a mode command so that said network device switches from said normal nework mode to a logical-address-learn mode;
   receiving a data packet specifying a destination logical address at a network port of said device;
   storing said destination logical address as the logical address of said device; and
   exiting said logical-address-learn mode to return to said normal network mode.

8. A method as recited in claim 7 wherein said mode command is received via a non-network communication path.

9. A method as recited in claim 8 wherein said mode command is initiated manually by a user contacting said network device.

10. A method as recited in claim 7 further comprising a step of transmitting a response to said data packet from said network port according to a network protocol and consistent with said logical address being the logical address of said network device.

11. A method as recited in claim 7 wherein said data packet is an address resolution packet.

12. A method of programming a hierarchical logical address for a network device, said method comprising the steps of:
   actuating a logical-address-learn mode of said network device;
   requesting a command from a programming device to a first port of said network device, said command incorporating a destination logical address, said request in the absence of a corresponding physical address causing an address resolution packet to be issued, said device responding to said address resolution packet by adopting said destination logical address as its hierarchical logical address, exiting said logical-address-learn mode to a normal network mode, and responding to said address resolution packet according to protocol;
   whereby said network device can respond to said command, when issued by said programming device, according to protocol.

13. A method as recited in claim 12 wherein, in said actuating step, said logical address mode is actuated via a non-network communication path by manually contacting said network device.

14. A method as recited in claim 13 wherein said command is a "ping" command.

15. A method as recited in claim 13 wherein said command is an HTTP "get" command.

16. A method of programming a network device with a hierarchical logical address, said method comprising the steps of:

activating an address learn mode of said network device;

requesting a programming device to send a command to a first network port of said network device, said request including a logical address, said command requiring a physical address;

said programming device sending a data packet with said logical address as a destination address to a first network port of said network device;

said network device storing said logical address as its logical address;

said network device exiting said address learn mode to enter a normal network mode;

said network device transmitting its physical address through said first network port to said programming device;

said programming device issuing said command to said first network port; and said network device responding to said command according to a protocol of said network.

17. A method as recited in claim 16 wherein said actuating step involves communication over a non-network communications channel.

18. A method as recited in claim 17 wherein said actuating step involves manually contacting said network device.

19. A method as recited in claim 16 wherein said command is a "ping" command.

20. A method as recited in claim 16 wherein said command is an HTTP "get" command.

21. A method as recited in claim 16 wherein said data packet is an address resolution packet.

22. A method as recited in claim 7 wherein said network device is a multi-port network device wherein said network port is a first network port, said device also having a second network port, said device not adopting the destination address of a second data packet recevied at said network port during said logical-address-learn mode prior to the reception of the first said data packet.

* * * * *